United States Patent
Lee et al.

(10) Patent No.: US 8,942,414 B2
(45) Date of Patent: Jan. 27, 2015

(54) METHOD AND APPARATUS FOR MAKING PERSONALIZED CONTENTS

(71) Applicant: Samsung Electronics Co., Ltd., Gyeonggi-do (KR)

(72) Inventors: Kyungeun Lee, Gyeonggi-do (KR); Sunghyun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 86 days.

(21) Appl. No.: 13/659,338

(22) Filed: Oct. 24, 2012

(65) Prior Publication Data

US 2013/0101217 A1    Apr. 25, 2013

Related U.S. Application Data

(60) Provisional application No. 61/551,173, filed on Oct. 25, 2011.

(30) Foreign Application Priority Data

Nov. 28, 2011   (KR) ........................ 10-2011-0125272

(51) Int. Cl.
| | | |
|---|---|---|
| G06K 9/00 | (2006.01) | |
| G06F 3/0488 | (2013.01) | |
| G06F 17/30 | (2006.01) | |
| G06F 9/44 | (2006.01) | |
| G06F 3/0482 | (2013.01) | |

(52) U.S. Cl.
CPC .............. *G06F 3/0488* (2013.01); *G06F 17/30* (2013.01); *G06F 9/44* (2013.01); *G06F 3/0482* (2013.01); *G06F 17/30699* (2013.01)
USPC ....................................................... 382/100

(58) Field of Classification Search
None
See application file for complete search history.

(56) References Cited

U.S. PATENT DOCUMENTS

| | | | |
|---|---|---|---|
| 2002/0055950 A1* | 5/2002 | Witteman | 707/500.1 |
| 2005/0182617 A1 | 8/2005 | Reynar et al. | |
| 2007/0011011 A1* | 1/2007 | Cogliano | 704/272 |
| 2009/0051692 A1 | 2/2009 | Gralley | |
| 2012/0023447 A1* | 1/2012 | Hoshino et al. | 715/823 |

* cited by examiner

*Primary Examiner* — Brian P Werner
(74) *Attorney, Agent, or Firm* — The Farrell Law Firm, P.C.

(57) ABSTRACT

A method for making personalized content by providing attributes to an object included in the electronic book content to reconfigure the electronic book content suited to tastes of a user and an apparatus thereof by executing electronic book content, extracting text information of the executed electronic book content, extracting keywords registered in an effect database from the extracted text information, providing a list of the extracted keywords when selection of a specific objected included in the electronic book content, and providing an attribute mapped to a keyword selected from the keyword list to the selected object.

18 Claims, 7 Drawing Sheets

FIG. 6
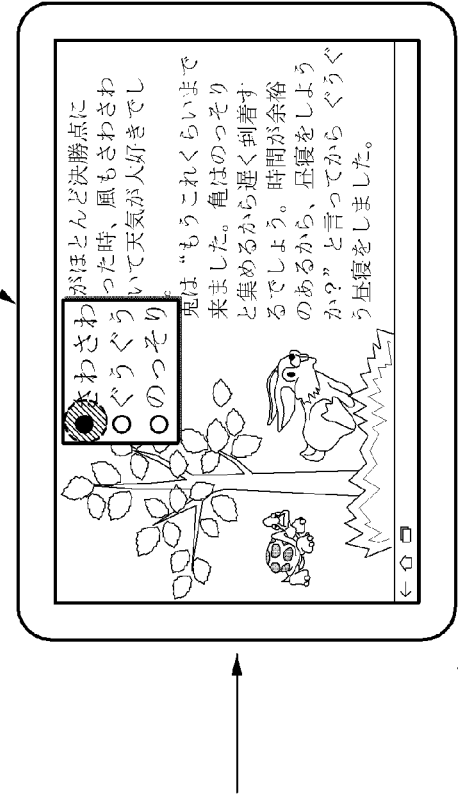
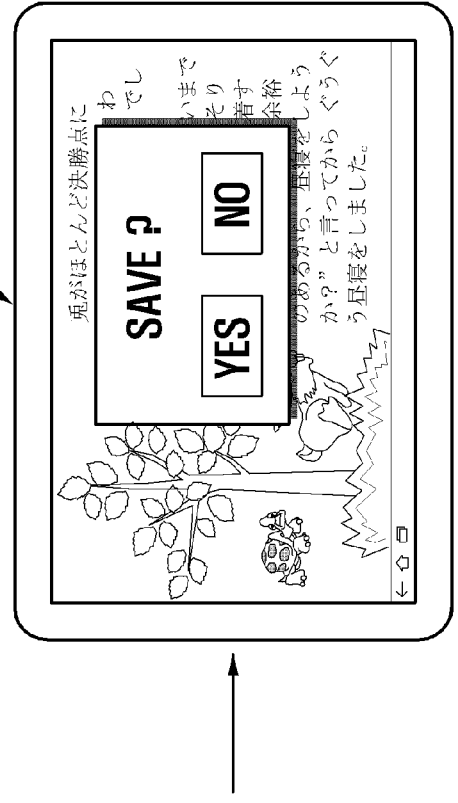

METHOD AND APPARATUS FOR MAKING PERSONALIZED CONTENTS

PRIORITY

This application claims priority under 35 U.S.C. §119(e) to a U.S. Provisional application filed on Oct. 25, 2011 in the United States Patent and Trademark Office and assigned Ser. No. 61/551,173, and under 35 U.S.C. §119(a) to a Korean patent application filed on Nov. 28, 2011 in the Korean Intellectual Property Office and assigned Serial No. 10-2011-0125272, the entire content of each of which is incorporated by reference.

BACKGROUND OF THE INVENTION

1. Field of the Invention

The present invention relates generally to electronic book content, and more particularly, to a method for making personalized content which provides an attribute to an object included in the electronic book content to reconfigure the electronic book content suited to tastes of a user and an apparatus thereof.

2. Description of the Related Art

In recent years, with the significant development of information and communication technology and semiconductor technology, supply and use of all types of portable terminals has rapidly increased. The electronic devices provide various functionality, such as a Television (TV) viewing function (e.g., mobile broadcasting such as Digital Multimedia Broadcasting (DMB) or Digital Video Broadcasting (DVB)), a music playback function (e.g., MPEG Audio Layer-3 (MP3)), a photographing function, a data communication function, an Internet access function, and a near distance wireless communication function.

Recent electronic devices provide a function for purchasing electronic book content and then reading the purchased content. However, conventional electronic book content is provided in a format standardized by a manufacturer. For instance, when the electronic book content includes an image object associated with text, the image object is fixed to a specific location. The standardized format of the provided electronic book content does not satisfy various tastes of the user. Accordingly, there is a need to provide a method of reconfiguring the standardized electronic book content according to the tastes of the user.

SUMMARY OF THE INVENTION

Accordingly, the present invention has been made in view of the above problems and/or disadvantages, and provides a method for making personalized content which provides attributes to an object included in the electronic book content to reconfigure the electronic book content suited to tastes of a user and an apparatus thereof.

According to an aspect of the present invention, there is provided a method for making personalized content which provides visual, audible, olfactory, and tactile effects through various sensors included in an electronic device, and an apparatus thereof.

According to an aspect of the present invention, there is provided a method for making personalized content which automatically sets attributes of an object based on association of texts configuring electronic book content and the object, and an apparatus thereof.

According to an aspect of the present invention, a method for making personalized content, includes executing electronic book content, extracting text information of the executed electronic book content, extracting keywords registered in an effect database from the extracted text information, providing a list of the extracted keywords when selection of a specific objected included in the electronic book content, and providing an attribute mapped to a keyword selected from the keyword list to the selected object.

According to another aspect of the present invention, a method for making personalized content, includes extracting a text from electronic book content configured by at least one page including a text and at least one object, extracting at least one keyword registered in an effect database from the extracted text, and providing an attribute mapped to the at least one extracted keyword to an associated object.

According to another aspect of the present invention, an apparatus for making personalized content, includes a display panel for displaying an electronic book content playback screen, a memory storing an effect database to which a keyword and control information are mapped, and a controller for extracting text information from the electronic book content playback screen, extracting a keyword registered in an effect database from the extracted text information, providing the extracted keyword list when selection of a specific object included in the electronic book content is detected, and providing an attribute mapped to a keyword selected from the keyword list to the selected object.

BRIEF DESCRIPTION OF THE DRAWINGS

The above and other aspects, features and advantages of the present invention will be more apparent from the following detailed description taken in conjunction with the accompanying drawings, in which:

FIG. 6 is a diagram illustrating an example of screens for describing the method for making personalized content according to a an embodiment of the present invention.

DETAILED DESCRIPTION OF THE EMBODIMENTS OF THE PRESENT INVENTION

Various embodiments of the present invention are described in detail with reference to the accompanying drawings. The same or like reference numbers are used to refer to the same or like components throughout the drawings. Detailed descriptions of well-known functions and structures are omitted to avoid obscuring the subject matter of the present invention.

An electronic device according to an embodiment of the present invention includes a Personal Digital Assistant (PDA), a mobile communication terminal, a smart phone, a tablet PC, a tabletop device, a digital TeleVision (TV), an Internet Protocol TV (IPTV), and a Large Format Display (LFD). Hereinafter, the portable terminal is used to describe aspects of the present invention.

Figure 1:
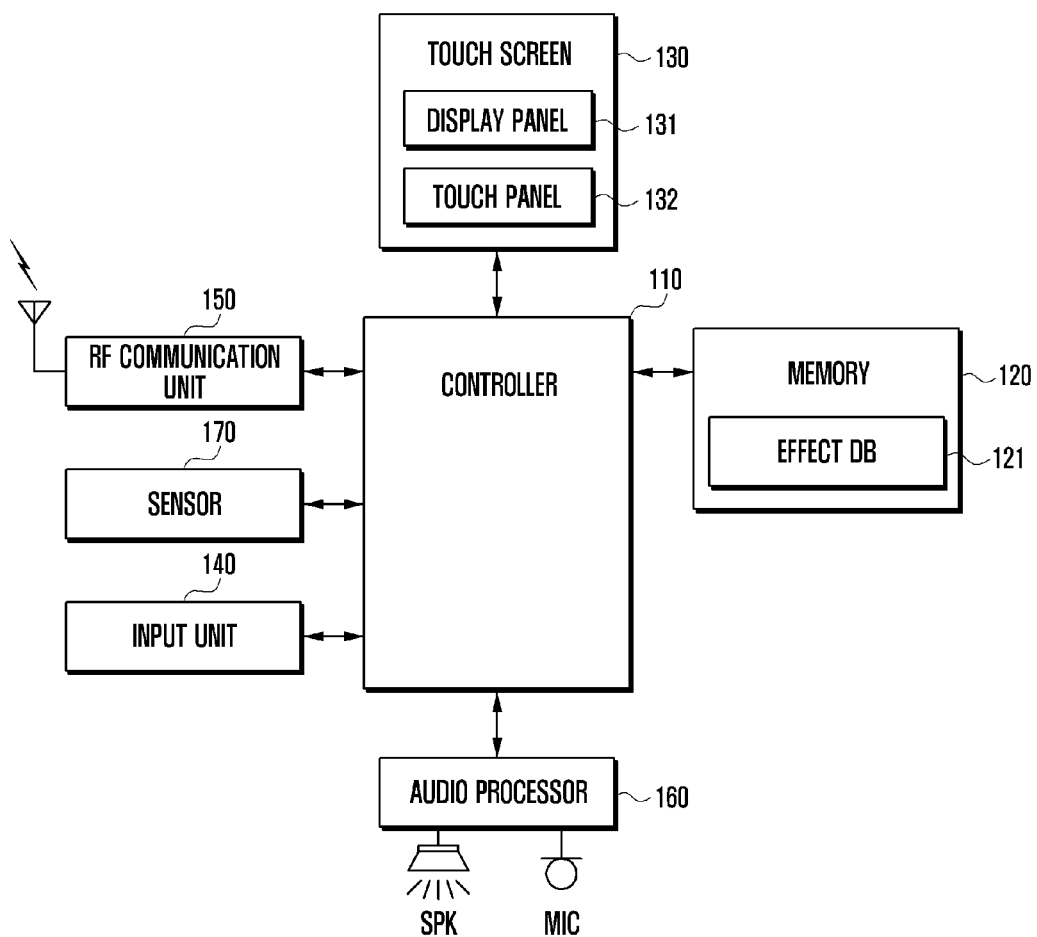
FIG. 1 is a block diagram illustrating a portable terminal according to an embodiment of the present invention.
Figure 2:
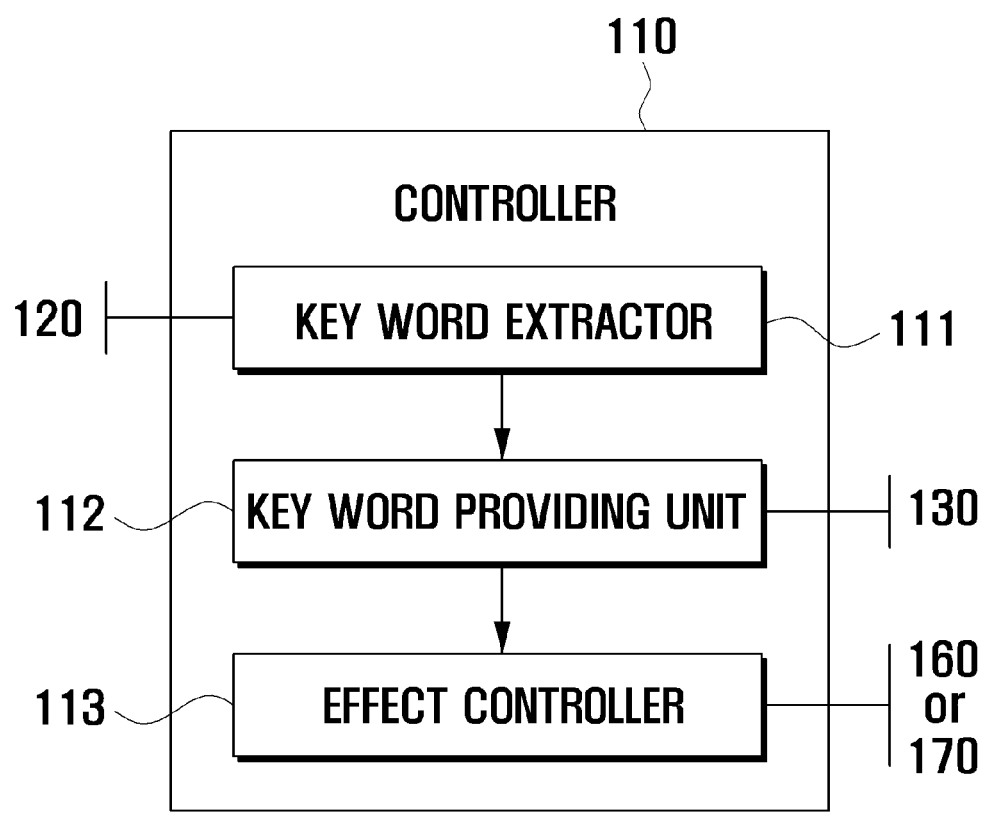
FIG. 2 is a block diagram illustrating a controller of the portable terminal in detail according to an embodiment of the present invention.

FIG. 1 is a block diagram illustrating a portable terminal according to an embodiment of the present invention and FIG. 2 is a block diagram illustrating a controller of the portable terminal in detail according to an embodiment of the present invention.

Referring to FIGS. 1 and 2, the portable terminal 100 includes a sensor 170, an audio processor 160, a Radio Frequency (RF) communication unit 150, an input unit 140, a touch screen 130, a memory 120, and a controller 110. The touch screen 130 includes a display panel 131 and a touch panel 132, the memory 120 includes an effect DataBase (DB), and the controller 110 includes a keyword extractor 111, a keyword providing unit 112, and an effect controller 113.

The RF communication unit 150 performs communication of the portable terminal 100. The RF communication unit 150 forms a preset communication channel with a supportable mobile communication system to perform communication such as voice communication and data communication. The RF communication unit 150 includes an RF transmitter for up-converting a frequency of a transmitted signal and amplifying the up-converted signal, and an RF receiver for low-noise-amplifying a received signal and down-converting the amplified signal. Further, the RF communication unit 150 receives electronic book content from an external server (not shown). When Digital Rights Management (DRM) is set to the electronic book content, the RF communication unit 150 supports data transmission/reception for performing cost payment and authentication to acquire the DRM. The RF communication unit 150 supports where personalized content made by the user are uploaded to another terminal or a specific web server (not shown), and supports formation of a communication channel where personalized content made and uploaded by another user are received. The RF communication unit 150 supports formation of the communication channel to update the effect DB 121 of the memory 120. That is, the RF communication unit 150 receives update information of the effect DB 121 from the specific web server (not shown). The RF communication unit 150 is configured by at least one of various communication modules such as mobile communication modules of 2G, 3G, and 4 G communication protocols and an Ethernet communication module based on a wired cable for supporting a mobile communication function or a data communication function.

The input unit generates various input signals necessary for operating the portable terminal 100. The input unit 140 is configured by various input means such as a keyboard, a keypad, or a key button according to presence of compatibility of the portable terminal 100. The input unit 140 is configured in the form of a touch map outputted on the touch screen 130. The input unit 140, according to an embodiment of the present invention, generates a mode selection input signal for providing attributes, an input signal for providing attributes to an object included in electronic book content, an input signal for moving pages of the electronic book content to which attributes are provided, an input signal for requesting such that generated personalized electronic book content is transmitted to a web server or another terminal, an input signal for requesting such that the personalized electronic content is received from a specific web server or another terminal, and an input signal for requesting update of the effect DB 121.

The touch screen 130 performs an input function and a display function. To do this, the touch screen 130 includes a display panel 131 and a touch panel.

The display panel 131 displays not only various menus of the portable terminal 100 but also information input by the user or information provided to the user. For example, the display panel 131 provides various screens according to use of the portable terminal 100, for example, a home screen, a message creation screen, and a call screen. The display panel 131 displays various screens for making personalized electronic book content. The various screens are described with referent to FIGS. 4 to 7 below. The display panel is configured as a Liquid Crystal Display (LCD), an Organic Light Emitting Diode (OLED), or an Active Matrix Organic Light Emitting Diode (AMOLED).

The touch panel 132 is mounted in front of the display panel 131. When a touch input device, for example, a finger of the user or a stylus, contacts the touch panel 132, the touch panel 132 generates a touch event and transfers the generated touch event to the controller 110. Specifically, the touch panel 132 recognizes a touch through a physical change (e.g., capacitance, resistance, etc.) according to contact of a touch input device, and transfers touch location information and types of touches (touch, touch release, tap, double touch, touch movement (drag, flick, sweep), multi-touch, etc.) to the controller 110. The touch panel 132, according to an embodiment of the present invention, transfers various control signals for controlling making the personalized electronic book content to the controller 110. The control signals include a signal requesting execution of electronic book content, a signal selecting an object, a signal requesting storage of content to which attributes are provided, and a page moving signal.

The sensor 170 provides an effect corresponding to an attribute set to the object. The sensor 170 includes a vibration sensor generating vibration and a scent sensor generating a scent. For example, when an object is a flower and an attribute corresponding to a scent of the flower is set, the scent sensor generates the scent of the flower. When the object is a person and an attribute indicating shivering with cold is set, the vibration sensor generates vibration corresponding shivering with cold. Parameters such as vibration intensity, vibration interval, or vibration time of the vibration sensor are defined in an effect DB 121.

The audio processor 160 is connected to a microphone (MIC) and a speaker (SPK), converts a voice signal into data and outputs the data to the controller 110. The audio processor 160 converts a voice signal input from the controller 110 into an audible sound, and outputs the audible sound through the SPK. That is, the audio processor 160 converts an analog voice signal from the MIC into a digital voice signal or converts a digital voice signal from the controller 110 into an analog voice signal and outputs the analog voice signal through the speaker SPK. Specifically, when an audio output attribute is set to an object, the audio processor 160 outputs an effect sound corresponding to the attribute through the SPK. For example, when the object is a tree and an attribute indicating swaying in the wind is set, the audio processor 160 outputs a wind sound and a leaf sound through the SPK. Trembling of the tree is implemented by a physical engine. The physical engine is used in computer graphic, video game, and movie fields.

The memory 120 stores programs and user data necessary for a function operation according to an embodiment of the present invention. For example, the memory 120 stores a program for controlling an overall operation of the portable terminal 100, an Operating System (OS) for booting the portable terminal 100, and application programs and various electronic book content (original electronic book content and reconfigured electronic book content) necessary for other options functions, for example, a camera function, a voice playback function, an image or moving image playback function, a near distance wireless communication function. The memory 120 stores a key map or a menu map for operating the touch screen 130. Here, the key map or the menu map is configured in various forms. For example, the key map includes a keyboard map, a 3*4 key map, a Qwerty key map, or a control key map for controlling an operation of a currently activated application program. The menu map includes a menu map for controlling an operation of a currently activated application program. Particularly, the memory 120 according to an embodiment of the present invention includes an application program for extracting text information from electronic book content, an application program comparing the extracted text information with the effect DB 121 to extract a keyword, and an application program for providing an attribute mapped to a selected keyword to the selected object.

The memory 120 stores an effect DB 121. The effect DB 121 defines an attribute of an object included in electronic book content. For example, the effect DB 121 stores a specific word mapped to control information. The specific word includes various object names, main words, verbs, mimetic words, or imitative words included in electronic book content. The specific word is used as a keyword. The control information refers to information necessary to operate the object. For example, when a movement attribute of the object is defined, the control information includes parameter information such as a moving path or moving speed. The movement of the object is actually expressed using a physical engine. The control information is parameter information for controlling operations of various sensors (e.g., vibration sensor, scent sensor, etc.) included in the portable terminal 100. For instance, the control information includes parameter information for defining a vibration size, a vibration time, and a vibration interval of the vibration sensor. The effect DB 121 is configured by various language types (e.g. Korean, Japanese, English, etc.) to support electronic book content of various languages. For instance, the effect DB 121 is stored as illustrated in a following Table 1.

TABLE 1

| | Types | Parameters |
|---|---|---|
| Words [Korean] | | |
| 깡충깡충 (Kang-chong kang-chong) | Physics | Stiffness = 400, damp = 0.02, linearLimit = 90, origin = 1, angle = 0 |
| 영금영금 (Yeong-kyum yeong-kyum) | Physics | Stiffness = 100, damp = 0.5, linearLimit = 30, origin = 1, angle = 0 |
| 산들산들 (Sandeul sandeul) | Sensor | Vibration = 3, Light = 1, Sound = 0 |
| Words [Japanese] | | |
| ぐう-ぐう (z-z-z) | Sensor | Vibration = 1, Light = 0, Sound = 2, SoundSrc = |
| のっそり (crawling) | Physics | Stiffness = 2, damp = 8, linearLimit = 80%, origin = 1, angle = 20 |
| さわさわ (gently) | Sensor | Vibration = 3, Light = 1, Sound = 0 |
| Words [English] | | |
| Hopping | Physics | Stiffness = 300, damp = 0.02, linearLimit = 80, origin = 1, angle = 0 |
| Jumping | Physics | Stiffness = 400, damp = 0.02, linearLimit = 80, origin = 1, angle = 0 |
| Leaping | Physics | Stiffness = 200, damp = 0.02, linearLimit = 80, origin = 1, angle = 0 |
| Crawling | Physics | Stiffness = 100, damp = 0.5, linearLimit = 30, origin = 1, angle = 0 |
| Blowing | Sensor | Vibration = 3, Light = 1, Sound = 0 |

The effect DB 121 includes various words except for words shown in Table 1, and include a DB with respect to other languages which are not illustrated in Table 1. Although the effect DB 121 includes one parameter in one word, as described above, alternatively, the effect DB 121 includes a plurality of parameters with respect to one word. For example, the effect DB 121 further includes a plurality of lower attributes changing parameters such as running speed, a running height, and a distance of a word of kang-chong kang-chong. Through this, the user provides various attributes to the object. The memory 120 stores an application program for a function such that the user changes a mapped parameter or adds a new parameter to each word of the effect DB 121.

The controller 110 controls an overall operation of the portable terminal 100 and signal flow between internal blocks of the portable terminal 100. Specifically, the controller 110 according to an embodiment of the present invention provides an attribute to an object included in standardized electronic book content to reconfigure the electronic book content suited to tastes of the user. To do this, the controller 110 includes a keyword extractor 111, a keyword providing unit 112, and an effect controller 113.

During execution of the electronic book content, the keyword extractor 111 extracts text information included in the electronic book content and a keyword stored in the effect DB 121 among the text information. The extraction of the keyword is achieved each time a page is moved to prevent overload. That is, the keyword extractor 111 compares texts included in a page output on a screen during changing the page with the effect DB 121 to extract words registered in the effect DB 121 form the texts. Alternatively, the keyword extractor 111 extracts a keyword from total electronic book content and maps the keyword to page information, and store the mapped page information. A procedure of previously generating a keyword list is automatically performed after completing download of the electronic book content or performed at the time of a user request. When selection of the object is detected, the keyword extractor 111 extracts the keyword from text information of a corresponding page.

When an object is selected from objects included in the electronic book content, the keyword providing unit 112 provides the extracted keywords in the form of a list. For example, the keyword providing unit 112 displays a keyword list window including the extracted keywords on one side of a screen of the touch screen 130. When the keyword list is previously generated and stored, the keyword providing unit 112 searches and provides a keyword list mapped to a current page. Accordingly, when the object is selected, the keyword providing unit 112 rapidly provides the keyword list.

When a specific keyword is selected from a keyword list window displayed on a side of the screen, the effect controller 113 provides an attribute mapped to a keyword to the selected object, and control such that the selected object is operated corresponding to the attribute. The effect controller 113 automatically provides an attribute to the object based on association of a text and the object. Specifically, the effect controller 113 analyzes a text included in the electronic book content to select an object associated with the extracted keyword, and automatically provides an attribute mapped to the extracted keyword to an associated object based on the selected result. For instance, when a specific page of the electronic book content includes an image object and a text such as "a turtle yeong-kyum yeong-kyum crawls to the image object," the effect controller 113 automatically provides an attribute mapped to a keyword "yeong-kyum yeong-kyum" to an image object of the turtle. The automatically provided attribute is set as a base attribute of the object. The base attribute is changed by the user.

That is, as illustrated above, when a movement attribute is provided to a selected object, the effect controller 113 moves the selected object according to parameter information (moving path, moving speed) mapped to the effect DB 121. The movement of the object is expressed through the physical engine. The effect controller 113 controls the audio processor 160 and the sensor 170 to further provide effects such as vibration generation, scent generation, effect sound providing. That is, an aspect of the present invention provides not only a visual effect in which an object is moved but also an audible effect, a tactile effect, and a olfactory effect. A detailed description of the controller 110 is described through a screen example drawing below.

Although not illustrated in FIG. 1, the portable terminal 100 further includes structural elements having additional functions such as a camera module for photographing images or moving images, a near distance communication module for near distance wireless communication, a broadcast receiving module for receiving broadcast, a digital sound source module like an MP3 module, and an Internet communication module executing Internet functions. Since the structural elements can be variously changed according to convergence trend of a digital device, those elements cannot be listed in detail. However, the portable terminal 100 includes structural elements equivalent to the foregoing structural elements.

Figure 3:
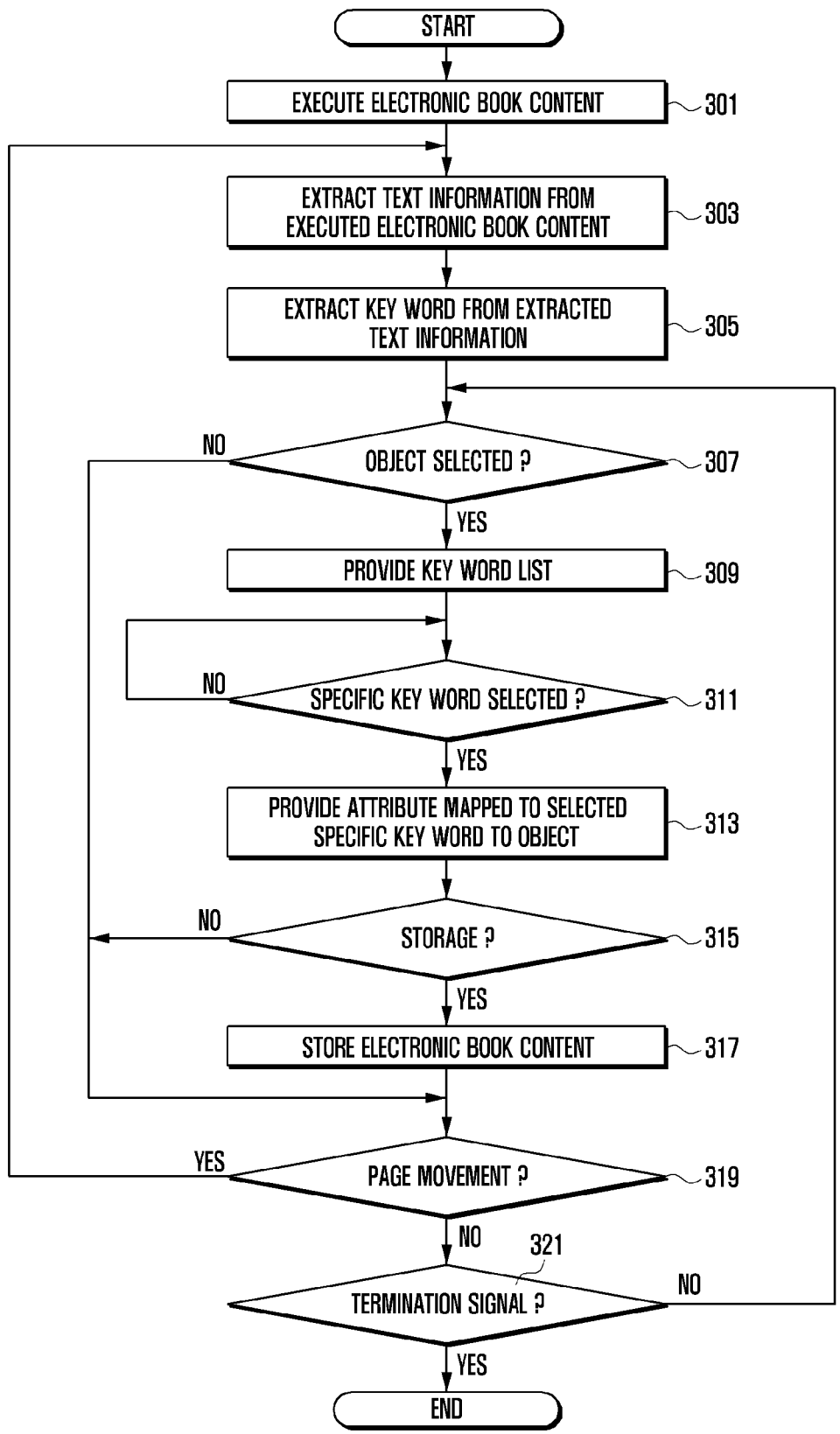
FIG. 3 is a flowchart illustrating a method for making personalized content according to an embodiment of the present invention.

FIG. 3 is a flowchart illustrating a method for making personalized content according to an embodiment of the present invention.

Referring to FIGS. 1 to 3, a controller 110 according to an embodiment of the present invention detects execution of electronic book content, in Step 301. The electronic book content includes at least one object. For example, the object becomes an image associated with content of a currently output page.

When the execution of the electronic book content is detected, the controller 110 extracts text information from the executed electronic book content, in Step 303. The controller 110 extracts only text information included in a page output on a current screen.

When extraction of the text information is completed, the controller 110 extracts a keyword from the extracted text information, in Step 305. The keyword becomes a verb, a mimetic word, or an imitative word included in the text information. For example, the keywords are "run," "walk," "kang-chong kang-chong," "yeong-kyum yeong-kyum," "sand-deul san-deual," or "cool-cool," and the controller 110 compares the extracted text information with a stored effect DB 121 to extract words included in the effect DB 121 among the text information as a keyword. Next, the controller 110 determines whether an object is selected, in Step 307. To do this, the controller 110 sets the object as a touchable object such that a user selects (touches) an object included in the electronic book content. When the object is not selected at step 307, the controller 110 proceeds to step 319. Conversely, when the object is selected, the controller 110 provides a keyword list, in Step 309. The controller 110 determines whether one specific keyword is selected from the keyword list, in Step 311. When the one specific keyword is not selected, the controller 110 returns to step 311. Conversely, when one specific keyword is selected, the controller 110 provides an attribute mapped to a selected specific keyword to an object, in Step 313. The controller 110 provides an effect corresponding to the attribute. For instance, when a moving attribute is provided to the selected object, the controller 110 moves the selected object according to a moving path and moving speed stored in the effect DB 121. To actually express movement of the selected object, a physical engine is used. The controller 110 provides a vibration effect using a vibration motor or provide an effect sound (e.g., wind sound, walk sound, thunder sound), and provide a flower scent using a scent sensor, or express night and day by controlling bright of the touch screen 130.

After that, the controller 110 determines whether storage is requested, in Step 315. When the storage is not requested, the controller 110 proceeds to step 319. Conversely, when the storage is requested, the controller 110 stores electronic book content (e.g., currently output page) in which an attribute is set to an object, namely, reconfigured by the user, in Step 317. Preferably, the controller 110 separately stores the reconfigured electronic book content without correcting original electronic book content.

Next, the controller 110 determines whether page movement is requested, in Step 319. When page movement is requested, the controller 110 returns to step 303 and repeat the foregoing procedures. Conversely, when the page movement is not requested, the controller 110 determines whether a termination signal is inputted, in Step 321. When the termination signal is not inputted, the controller 110 returns to step 307 and repeat the foregoing procedures. Conversely, when the terminal signal is inputted, the controller 110 terminates execution of the electronic book content.

Although text information of a current output page is extracted each time a page is changed, as described above, the present invention is not limited thereto. Alternatively, text information is extracted from total electronic book content, and from previously generated and stored keyword list for each page. As described above, an operation of previously generating and storing a keyword list is automatically performed after completion of download of the electronic book content or is performed by user setting. The controller 110 outputs a pop-up window for checking whether a keyword list is generated during initial execution of the electronic book content. When the user approves, the controller 110 generates the keyword list for each page and store the keyword mapped to page information. When the object is selected, the controller 110 extracts text information of a corresponding page, and compares the extracted text information with an effect DB 121 to extract a keyword. Although the text information is extracted from the electronic book content when execution of the electronic book content is detected, the present invention is not limited thereto. For example, during execution of the electronic book content, the present invention operates in a general electronic book view mode. When a specific mode (e.g., electronic book edit mode) is executed through a menu, the present invention provides for such that text information to be extracted.

Although the controller 110 provides an attribute selected by the user to the selected object through the keyword list, the present invention is not limited thereto. For example, the controller 110 analyzes a text included in a specific page of electronic book content to select an object associated with the extracted keyword. The controller 110 automatically provides an attribute mapped to the extracted keyword to a selected object having the association based on the selection result. A procedure of automatically providing the object uses a characteristic in that a text included in electronic book content and the object have the association with each other. For instance, when the electronic book content include text information indicating that a rabbit kang-chong kang-chon runs and a rabbit image, the controller 110 provides an attribute mapped to a keyword of kang-chong kang-chong to the rabbit image.

Although not illustrated in FIG. 2, when an effect DB 121 by language types exists in the memory 120, the controller 110 extracts the text, recognize a language type of the extracted text, and extract a keyword with reference to an effect DB 121 of a corresponding language.

Figure 4:
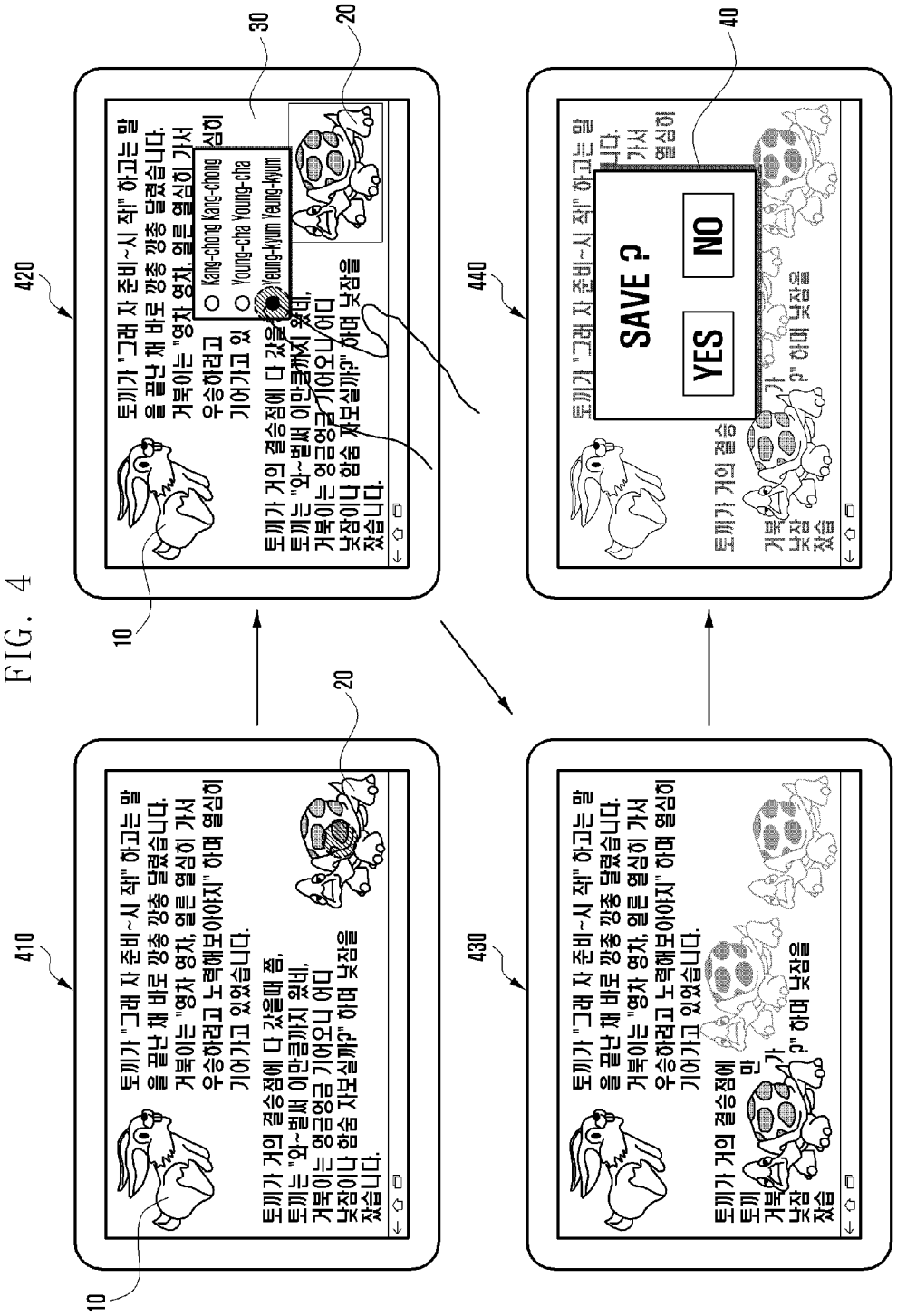
FIG. 4 is a diagram illustrating an example of screens for describing the method for making personalized content according to an embodiment of the present invention.

FIG. 4 is a diagram illustrating an example of screens for describing the method for making personalized content according to an embodiment of the present invention.

Referring to FIGS. 1 to 4, a user generates an input signal for activating electronic book content stored in the memory 120 during an operation procedure. To do this, the portable terminal 100 provides an electronic book content list stored in the memory 120 according to a user request. If an input signal selecting specific electronic book content is generated from a corresponding list, the portable terminal 100 performs a procedure for activating the selected electronic book content. Accordingly, a touch screen 130 of the portable terminal 100 outputs an electronic book content playback screen as illustrated in an example of a screen of reference numeral 410 illustrated in FIG. 4. The electronic book content playback screen includes a text and an image object. The text and the object have association with each other. For example, as illustrated in FIG. 4, when current output electronic book content include a text indicating that a rabbit and a turtle perform a running game, the electronic book content includes a rabbit image object and a turtle image object. As described above, the electronic book content playback screen is outputted, the controller 110 identifies text information and an image object to extract text information and extract a keyword to which an attribute is provided from the extracted text information. To do this, the controller 110 compares text information with an effect DB 121. The controller 110 sets a region on which the image object is displayed as a touchable region such that the user selects (touch) an image object included in the content playback screen.

Here, when a touch event of a specific object (e.g., a turtle image 20), the controller 110 provides a keyword list window 30 including the extracted keywords to one side of a screen as illustrated in an example of a screen of reference numeral 420.

When a specific keyword (e.g., yeong-kyum yeong-kyum) is selected from the keyword list window 30, the controller 110 provides an attribute mapped to the selected keyword "yeong-kyum yeong-kyum" as illustrated in an example of a screen of reference numeral 430. The controller 110 operates a selected object 20 according to the provided attribute such that the user directly confirms the provided attribute. For example, the controller 110 provides a shape in which a turtle yeong-kyum yeong-kyum crawls. Movement of the selected object is actually expressed using a physical engine. The physical engine is used in computer, graphic, video game, and movie fields. An operation of the object is performed only once or is repeatedly performed.

When providing an attribute of the selected object 20 is terminated, the controller 110 outputs a pop-up window inquiring presence of storage on a side of a screen as illustrated in an example of a screen of reference numeral 440. When the storage is requested, the controller 110 stores a page in which an attribute is provided to an object according to tastes of the user and reconfigured. The controller 110 stores the reconfigured page separately from an original page.

After that, the user selects another object (e.g., rabbit image 20) to provide an attribute or to be moved to a next page. As described above, the user provides an attribute to an object and then store a page, thereby reconfiguring electronic book content according to the tastes of the user.

Although not illustrated, the controller 110 executes original content or executes reconfigured content according to user setting when execution of an electronic book is requested. When the reconfigured electronic book content is executed, the controller 110 automatically executes the attribute provided to the object. The attribute provided to the object is executed when a preset operation signal is inputted. For instance, when the user double-touches a turtle image, the controller 110 provides the given effect (e.g., an animation effect of yeong-kyum yeong-kyum crawls).

Figure 5:
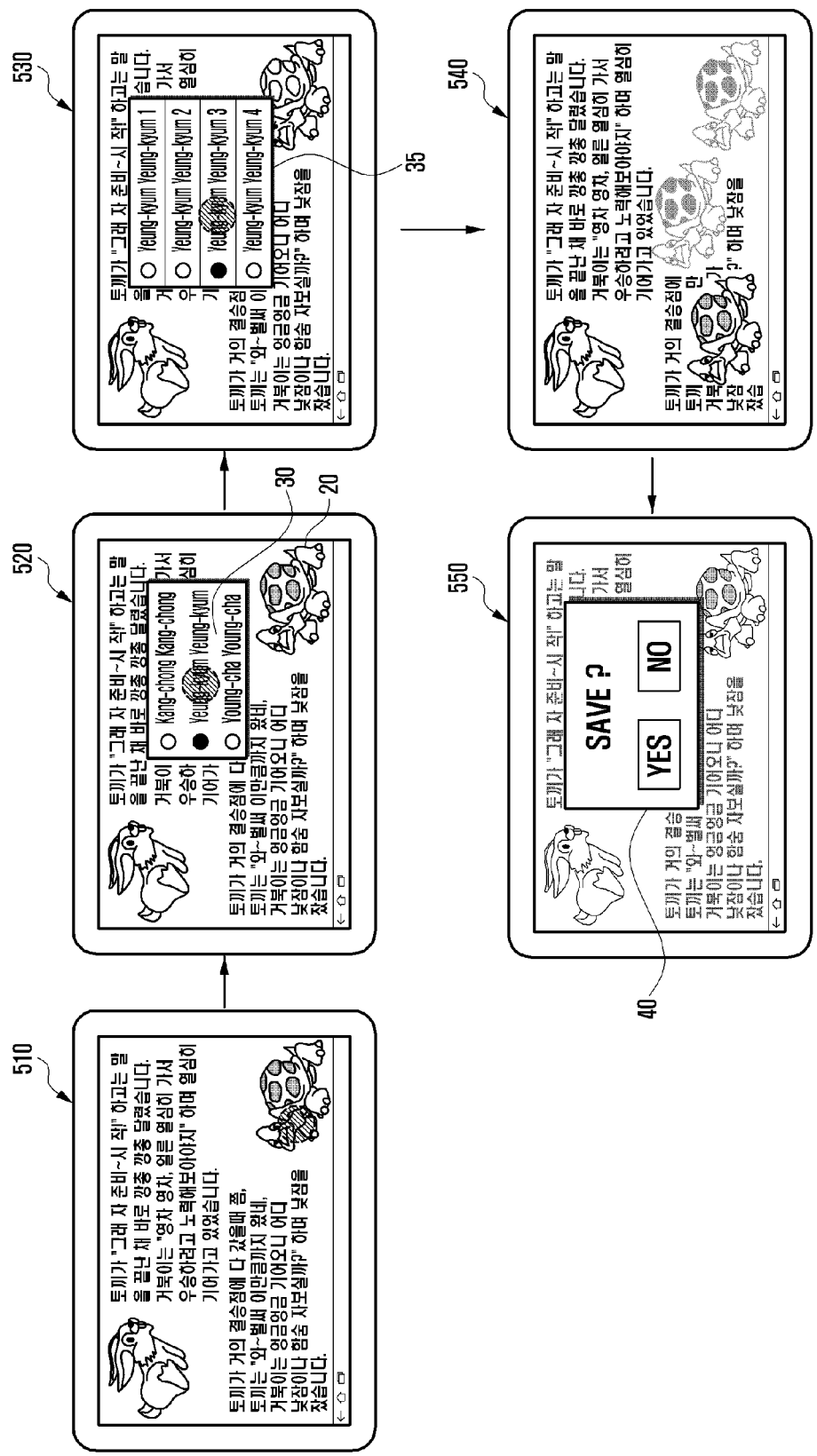
FIG. 5 is a diagram illustrating an example of screens for describing the method for making personalized content according to an embodiment of the present invention.

FIG. 5 is a diagram illustrating an example of screens for describing the method for making personalized content according to an embodiment of the present invention.

First, referring to FIGS. 1 to 5, the portable terminal 100 provides an electronic book content list stored in the memory 120 according to a user request and performs a procedure of activating electronic book content selected from a corresponding list. Accordingly, the touch screen 130 of the portable terminal 100 outputs an electronic book content playback screen as illustrated in an example of a screen of reference numeral 510. The electronic content playback screen includes a text and an image. As described above, the electronic book content playback screen is outputted, the controller 110 identifies text information and an image object to extract the text information, and extract a keyword to which an attribute is provided from the extracted text information. To do this, the controller 110 compares the text information with the effect DB 121. The controller 110 sets a region on which the image object is displayed as a touchable region such that the user selects (touch) an image object included in the content playback screen.

Here, if a touch event of a specific object (e.g., a turtle image 20) is detected, the controller 110 provides a keyword list window 30 including the extracted keywords on a side of a screen as illustrated in an example of a screen of reference numeral 520.

When a specific keyword (e.g., yeong-kyum yeong-kyum) is selected from the keyword list window 30, the controller 110 outputs a lower attribute list window 35 including a lower attribute of a selected keyword as illustrated in an example of a screen of reference numeral 530 on a side of a screen. As described above, an embodiment of the present invention provides various attributes to the selected object 20 through the lower attribute list window 35. For instance, the user sets a moving path and moving speed of a turtle depending on the tastes of the user.

When one lower attribute is selected from the lower attribute list window 35, the controller 110 provides an attribute mapped to the selected lower attribute "yeong-kyum yeong-kyum 3" to the selected object 20. The controller 110 provides an animation effect in which a turtle crawls corresponding to the selected lower attribute "yeong-kyum yeong-kyum 3" as illustrated in an example of a screen of reference numeral 540. The providing of the attribute to the selection object is terminated, the controller 110 outputs a pop-up window 40 inquiring presence of storage on a side of the screen as illustrated in an example of a screen of reference numeral 550. When the storage is requested, the controller 110 stores the reconfigured page in which an attribute is provided to the object separately from an original page.

Although FIG. 5 illustrates that a lower attribute list window 35 is outputted when a specific list is selected from the keyword list window 30, alternatively the lower attribute list window 35 is outputted when a specific keyword is long-touched from the keyword list window 30, and provide an attribute (e.g., "yeong-kyum yeong-kyum 1") set as default during short touch to a selected object.

FIG. 6 is a diagram illustrating an example of screens for describing the method for making personalized content according to an embodiment of the present invention. FIG. 6 has the same configuration as that of FIG. 4 with the difference being that languages of electronic book content differ from each other, and thus a detailed description of FIG. 6 is omitted. That is, a screen example of reference numeral 610 corresponds to a screen example of reference numeral 410, a screen example of reference numeral 620 corresponds to a screen example of reference numeral 420, a screen example of reference numeral 630 corresponds to a screen example of reference numeral 430, and a screen example of reference numeral 640 corresponds to a screen example of reference numeral 440. To do this, the present invention preferably stores an effect DB 121 by various languages. The controller 110 extracts text information, confirm a type of a language of a text, and extract the keyword with reference to the effect DB 121 of a corresponding language.

Figure 7:
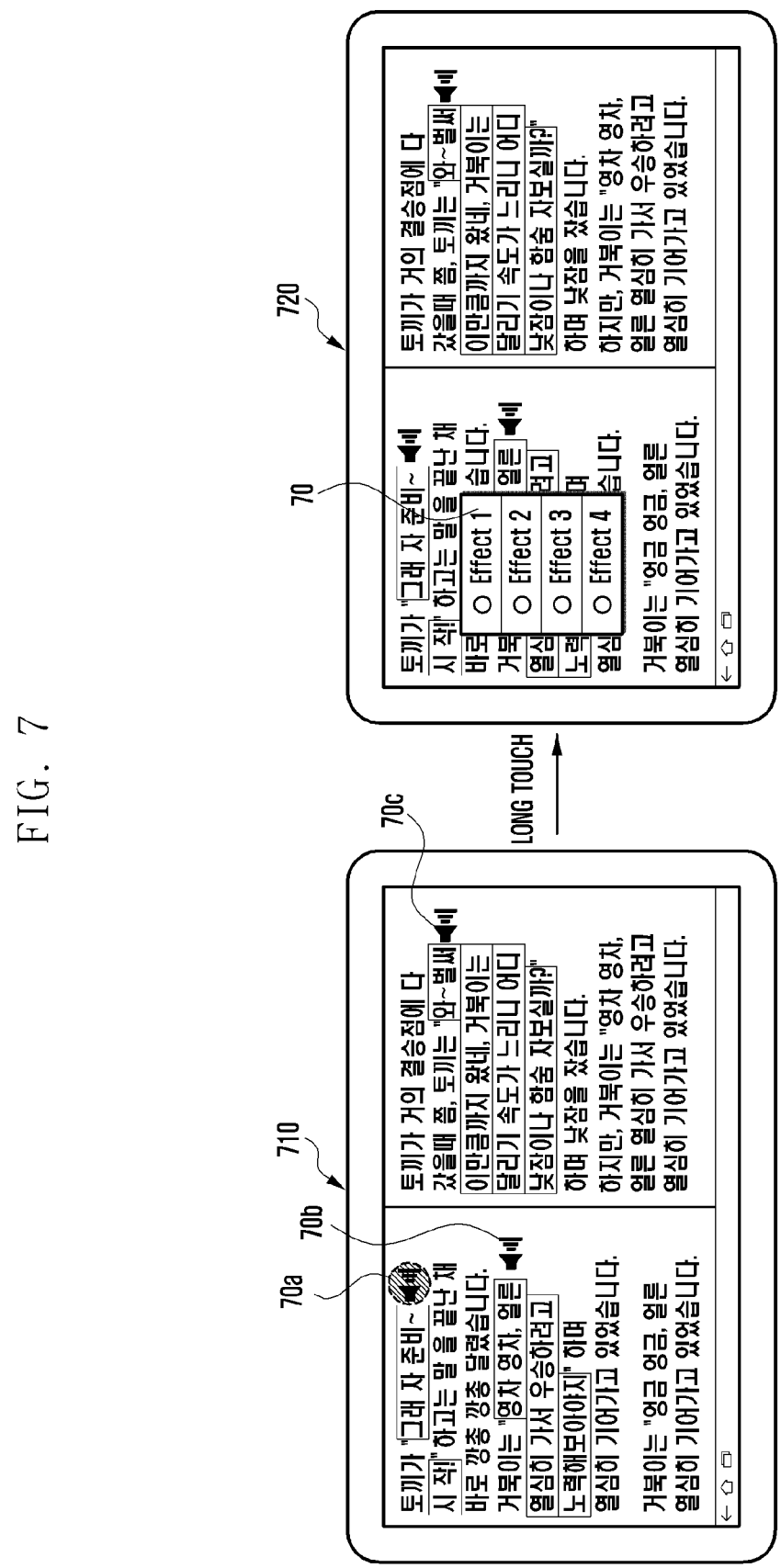
FIG. 7 is a diagram illustrating an example of screens for describing the method for making personalized content according to a an embodiment of the present invention.

FIG. 7 is a diagram illustrating an example of screens for describing the method for making personalized content according to an embodiment of the present invention.

Referring to FIGS. 1 to 7, electronic book content, according to an embodiment of the present invention, includes a text and an audio object. When one is selected (touched) from a plurality of audio objects 70a, 70b, and 70c, the controller 110 outputs an audio signal stored and mapped to a corresponding audio object 70a through the speaker SPK. In a state like an example of a screen of reference numeral 710 illustrated in FIG. 7, when a long touch event of maintaining a touch on a certain audio object 70a for greater than a preset time occurs, the controller 110 outputs an effect setting window 70 on a side of the screen as illustrated in an example of a screen of reference numeral 720. The effect setting window 70 includes an effect function changing speed and a tone (e.g., man tone, woman tone, etc.) of an audio signal or an effect function operating the portable terminal 100 using the sensor 170. For example, the effect function includes an effect function of vibrating the portable terminal 100, an effect function of flicking a screen, and an effect function of generating a scent.

The foregoing method for making personalized content, according to an aspect of the present invention, is implemented in an executable program command form by various computer means and recorded in a computer readable recording medium. The computer readable recording medium includes a program command, a data file, and a data structure individually or a combination thereof. The program command recorded in a recording medium is specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device is configured as at least one software module to perform an operation of the present invention.

As mentioned above, a method and an apparatus for making personalized content reconfigures electronic book content provided in the standardized form according to tastes of the user. For example, according to aspects of the present invention, there is provided a movement effect of an image object included in electronic book content using a physical engine or various effects (vibration, screen change, scent, acoustic effect) set by the user through a display and an audio output device. That is, the user reconfigures electronic book content according to tastes of the user to make personalized electronic book content. Further, according to an aspect of the present invention, an attribute is automatically provided to an object based on text information associated with the object.

Although various embodiments of the present invention have been described in detail herein, it will be apparent to those of ordinary skill in the art that variations and modifications may be made without departing from the spirit and scope of the present invention, as defined by the appended claims.

What is claimed is:

1. A method for making personalized content, the method comprising:
executing electronic book content;
extracting text information included in the executed electronic book content;
extracting keywords registered in an effect database from the extracted text information;
providing a list of the extracted keywords, when selection of a specific object included in the electronic book content is detected; and
providing an attribute, mapped to a keyword selected from the keyword list, to the selected object.

2. The method of claim 1, wherein extracting the text information is performed when changing a page or selecting the object.

3. The method of claim 1, wherein providing the keyword list comprises providing a lower attribute list window including a lower attribute of the keyword selected from the keyword list.

4. The method of claim 3, wherein providing the lower attribute list window is performed when long-touching a specific keyword on the keyword list.

5. The method of claim 1, wherein providing the attribute to the selected object comprises controlling the selected object to operating according to an effect corresponding to the provided attribute.

6. The method of claim 1, further comprising activating at least one sensor for providing at least one of visual, audible, tactile and olfactory effect corresponding to the attribute mapped to the selected keyword.

7. The method of claim 1, further comprising storing the electronic book content in which the attribute is provided to the specific object.

8. The method of claim 1, wherein extracting the text information comprises:
 confirming a type of language of the extracted text information; and
 selecting an effect database corresponding to the confirmed type of the language.

9. The method of claim 1, further comprising transmitting the reconfigured electronic book content to another terminal or a web server.

10. An apparatus for making personalized content, the apparatus comprising:
 a display panel configured to display an electronic book content playback screen;
 a memory configured to store an effect database in which a keyword and control information are mapped; and
 a controller configured to extract text information from the electronic book content playback screen, extract keywords, registered in an effect database, from the extracted text information, provide an extracted keyword list, when selection of a specific object included in the electronic book content is detected, and provide an attribute, mapped to a keyword selected from the keyword list, to the selected object.

11. The apparatus of claim 10, wherein the controller extracts the text information when changing a page or selecting the object.

12. The apparatus of claim 10, wherein the controller provides a lower attribute list window, when long-touching a specific keyword on the keyword list.

13. The apparatus of claim 10, wherein the controller controls the selected object to operate according to an effect corresponding to the provided attribute.

14. The apparatus of claim 10, further comprising at least one sensor configured to provide at least one of visual, audible, tactile and olfactory effect corresponding to the attribute mapped to the keyword.

15. The apparatus of claim 10, wherein the memory provides an attribute to the object to store original electronic book content separately from a reconfigured electronic book content.

16. The apparatus of claim 10, wherein the controller confirms a type of a language of the extracted text information when the text information is extracted, and extracts a keyword selecting an effect database corresponding to the confirmed type of the language.

17. The apparatus of claim 10, further comprising a radio frequency communication unit configured to provide the attribute to the object, to transmit reconfigured electronic book content to another terminal or a web server and to receive the reconfigured electronic book content from the another terminal or the web server.

18. The apparatus of claim 17, wherein the radio frequency communication unit receives update information of the effect database.

* * * * *